United States Patent [19]
Kärker et al.

[11] 4,146,423
[45] Mar. 27, 1979

[54] NUCLEAR REACTOR

[75] Inventors: Stig R. Kärker, Nyköping, Sweden; Knut Bratland, Li, Norway

[73] Assignee: Aktiebolaget Atomenergi, Stockholm, Sweden

[21] Appl. No.: 854,199

[22] Filed: Nov. 23, 1977

[30] Foreign Application Priority Data

Dec. 7, 1976 [SE] Sweden .................................. 7613764

[51] Int. Cl.² ............................................. G21C 1/00
[52] U.S. Cl. ...................................................... 176/52
[58] Field of Search ...................................... 176/51–53

[56] References Cited

U.S. PATENT DOCUMENTS

| | | | |
|---|---|---|---|
| 3,205,145 | 9/1965 | Margen | 176/53 |
| 3,372,092 | 3/1968 | Margen | 176/52 |

*Primary Examiner*—Harvey E. Behrend
*Attorney, Agent, or Firm*—Burns, Doane, Swecker & Mathis

[57] ABSTRACT

The invention relates to a nuclear reactor having a pressure vessel of pre-stressed concrete. The reactor contains a containment vessel spaced from the pressure vessel by means of an insulation gap. The containment vessel consists of two parts having no mechanical joint between them. It is described how the insulation fluid in the insulation gap is prevented from penetrating into the interior of the reactor.

2 Claims, 2 Drawing Figures

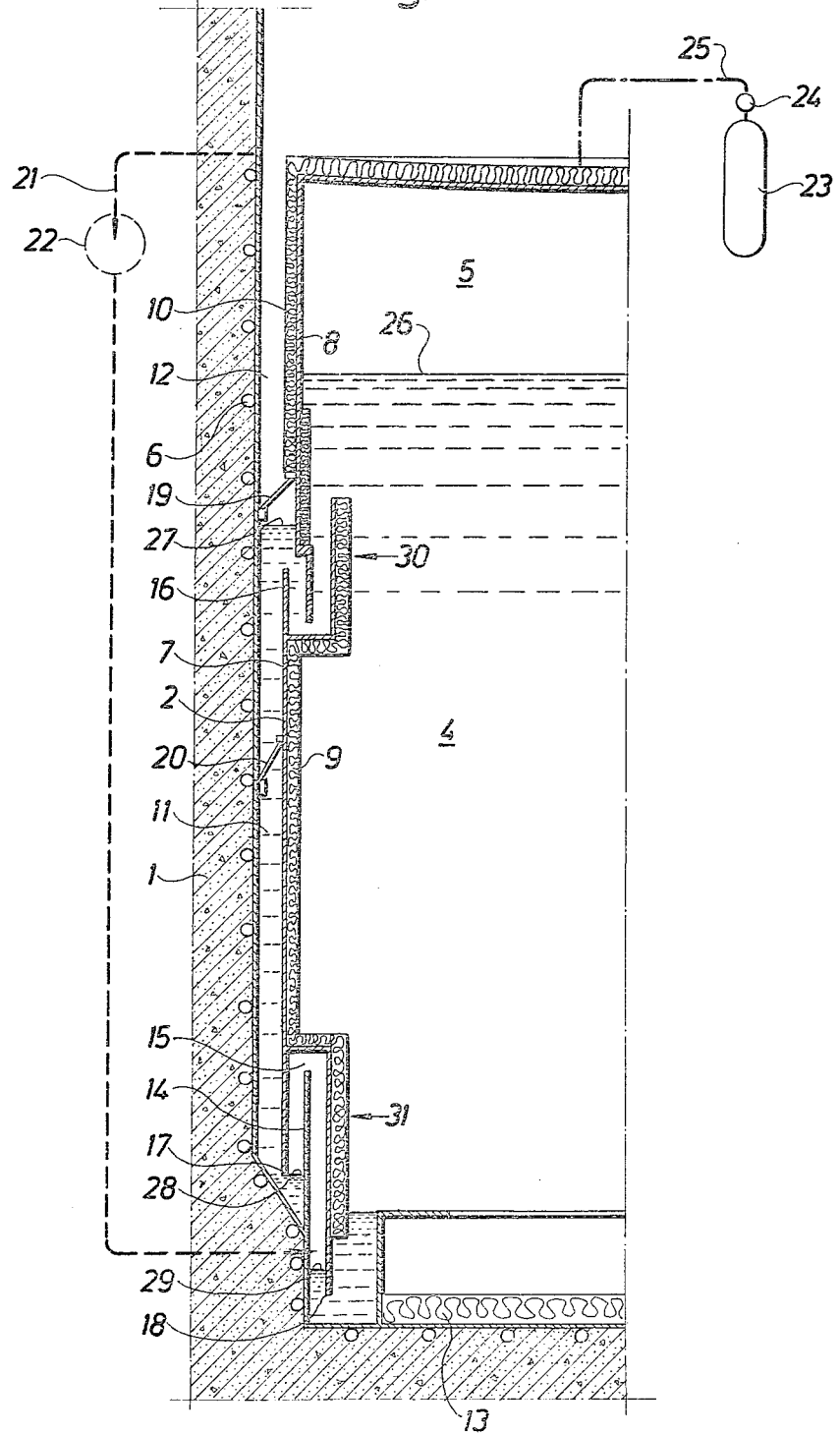

NUCLEAR REACTOR

The invention relates to a nuclear reactor having a water-cooled core, a pressure vessel of pre-stressed concrete and an inner containment vessel spaced from the pressure vessel so that an insulating gap is formed between the pressure vessel and the containment. The invention relates specifically to a water-cooled reactor of the type described, in which the pressure vessel contains both hot cooling water and steam, preferably a boiling water reactor.

In a nuclear reactor of the type described it is desirable for the temperature of the concrete not to exceed about 50° C. This is achieved primarily by said insulating gap which may be filled with water or with a gas. Insulation is improved if an insulating layer is applied on the inner containment. A cooling system is also arranged in the concrete pressure vessel, suitably in the form of cooling pipes in the concrete close to the inner wall of the pressure vessel.

The object of the invention is to effect a reactor in which the above-mentioned inner containment is divided into two parts which are not secured to each other. The inner containment is thus more easily handled, and inspection of the containment and insulating gap is easier to perform. Furthermore, problems connected with thermal expansion of the inner containment are reduced, such as attachment of the container to the pressure vessel and the arrangement of pipes for the supply of feed water to the reactor and for the removal of steam or hot water from the reactor.

The nuclear reactor according to the invention is characterized in that the containment consists of an upper part and a lower part, the adjacent parts of the upper part and the lower part being arranged to form a water-filled passage having a U-shaped cross section between the insulating gap and the inside of the reactor, and adjacent parts of the lower part and the pressure vessel being arranged to form a gas-filled lock having an inverted U-shaped cross section between the insulating gap and the inside of the reactor.

The invention will be described with reference to the accompanying drawing.

FIG. 2 illustrates on a larger scale part of the wall of the inner containment.

Figure 1:
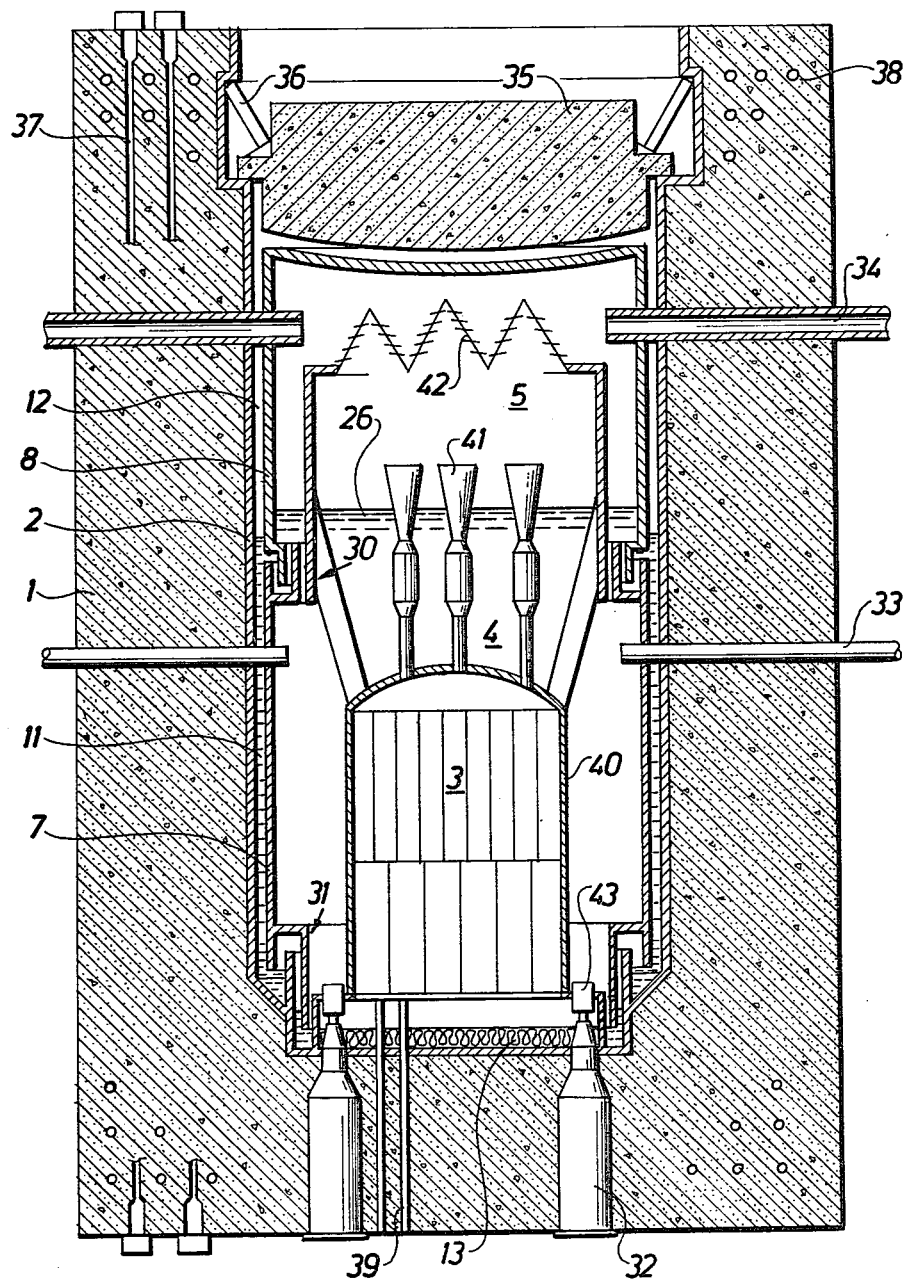
FIG. 1 illustrates a nuclear reactor according to the invention.

The illustrated nuclear reactor comprises a pressure vessel 1 of pre-stressed concrete. The pre-stressing members are axially extending cables 37 and circumferentially extending cables 38. The inside of the pressure vessel is clad with a sealing steel lining 2. The pressure vessel contains a moderator tank 40 which contains a core or hearth 40 in which the nuclear fuel is located. The pressure vessel also contains space 4 for hot water and a space 5 for steam. The steam produced in the hearth 40 is separated from accompanying water in steam separators 41. Water droplets which may still accompany the steam are removed in a steam dryer 42. The steam leaves the reactor through conduits 34. Feed water is supplied through conduits 33. A forced internal circulation of water is maintained by means of pumps 43 driven by motors 32. The effect of the reactor is controlled in a known way be means of rods of a neutron absorbing material. The maneuvering rods for these neutron absorbators extend through ducts 39 in the bottom of the pressure vessel. Cooling tubes 6 are arranged in the concrete close to the steel lining 2 in order to keep down the temperature in the concrete. The pressure vessel is closed by means of a concrete lid 35. The lid is secured to the pressure vessel by means of rods 36.

The reactor also includes an inner containment 7, 8, spaced from the steel lining 2 of the pressure vessel so that an insulating gap 11, 12 is formed between the pressure vessel and the inner containment. The containment 7, 8 is made of steel and is relatively thin-walled since it is not subjected to any differential pressure. The containment comprises an upper part 8 and a lower part 7. The upper part 8 consists of a cylindrical part and a substantially flat, upper end wall. Thermal insulation 10 is provided on the outside of the upper part 8. The upper part 8 is supported on legs 19 extending between projections on the inside of the steel lining 2 and projections on the outside of the upper part 8. The lower part 7 is cylindrical and is provided with thermal insulation 9 on the inside and/or the outside. It is suspended on support legs 20 in the same way as the upper part.

The lower part 7 is provided with double walls at the top, between which the lower edge of the upper part 8 is located. A communication 16 is thus formed, having U-shaped cross section, between the insulating gap 11, 12 and the inside of the reactor. Reference numeral 30 indicates generally the zone of said communication 16. The lower part 7 is also provided with double walls 17, 18 at the bottom, between which is a cylindrical wall 14, joined at the bottom to the steel lining 2. A communication 15 is thus formed between the insulating gap 11, 12 and the inside of the reactor, said communication being in the form of an inverted U. Reference numeral 31 indicates generally the zone of said communication 15. The normal water level in the reactor is indicated at 26. This water level is higher than the level of the zone 30. Consequently, the communication 16 will be filled with water, thus preventing gas from the gap 12 from penetrating into the interior of the reactor. The normal water level in the insulating gap is indicated at 27, and the normal water levels in the communication 15 are indicated at 28 and 29.

A pipe 21 containing a gas pump 22 is connected at the top to the upper part of the insulating gap 11, 12 and at the bottom to the communication 15. The upper part of the insulating gap 11, 12 is connected by a pipe 25 to a bottle 23 for compressed gas, suitably nitrogen or helium which, with the aid of a valve 24 controlled by differential pressure, maintains a gas pressure in the upper part of the insulating gap which is as high as the steam pressure in the reactor. Pressure differences in the reactor will cause the level of the water surface 27 to alter, thus altering the gas pressure in the gap 12 without an external gas system having to come into function.

During normal operation of the reactor, the water level 26 and the water level 27 in the insulating gap will be in the positions shown. The water level 28 in the lefthand part of the gas-filled passage 15 is on a level with the lower edge of the wall 7. This water level is maintained by the pump 22 pumping gas into the passage 15 so that the excess gas bubbles up through the water in the insulating gap 11, 12. The water level 29 in the righthand part of the passage 15 is lower than level 28. The wall 18 must extend downwardly so much further than the wall 17 that the gas can never penetrate under the wall 18 into the reactor. The difference in height between the water levels 28 and 29 is less than that between the water levels 26 and 27. This is because the water in the insulating gap 11, 12 is relatively cool, whereas the water in the reactor is hot and has considerably lower density. The volume of gas maintained in the lock 15 constitutes an effective demarcation between the cold water in the insulating gap 11, 12 and the hot water in the reactor. No mixing of the water in the gap 11, 12 and the water in the reactor is therefore possible. Consequently, satisfactory insulation is achieved between the hot reactor water and the lining 2.

The invention thus prevents the cold water in the gap 11, 12 from penetrating into the reactor, although there is no mechanical connection between the lower part of the wall 7 and the lining 2. As a result of the invention the heat insulating agent in the gap 11, 12 will consist of gas in the upper portion 12 and of substantially stagnant water in the lower portion 11.

What is claimed is:

1. Nuclear reactor having a water-cooled hearth (3), a pressure vessel (1) of pre-stressed concrete, and an inner containment vessel (7, 8) spaced from the pressure vessel (1) so that an insulating gap (11, 12) is formed between the pressure vessel (1) and the containment (7, 8), characterized in that the containment (7, 8) consists of an upper part (8) and a lower part (7), the adjacent parts of the upper part (8) and the lower part (7) being arranged to form a water-filled lock (16), having a U-shaped cross section, between the insulating gap and the inside of the reactor, and adjacent parts of the lower part (7) and the pressure vessel being arranged to form a gas-filled passage (15), having an inverted U-shaped cross section, between the insulating gap and the inside of the reactor.

2. Nuclear reactor according to claim 1, characterized in that means (22) are provided to introduce gas into the gas-filled passage (15), and that the outer part of the gas-filled passage has a smaller vertical dimension than the inner part, so that excess gas introduced penetrates into the insulating gap.

* * * * *